(12) United States Patent
Benthien et al.

(10) Patent No.: US 10,378,198 B2
(45) Date of Patent: Aug. 13, 2019

(54) ROTARY JOINT, FRAMEWORK CONSTRUCTION KIT, FRAMEWORK WITH ROTARY JOINTS AND METHOD FOR MANUFACTURING A ROTARY JOINT

(71) Applicant: AIRBUS OPERATIONS GMBH, Hamburg (DE)

(72) Inventors: Herman Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 328 days.

(21) Appl. No.: 15/247,008

(22) Filed: Aug. 25, 2016

(65) Prior Publication Data
US 2017/0058959 A1   Mar. 2, 2017

(30) Foreign Application Priority Data
Aug. 27, 2015   (EP) .................................... 15182771

(51) Int. Cl.
*E04B 1/19*   (2006.01)
*F16C 11/06*   (2006.01)
(Continued)

(52) U.S. Cl.
CPC .................. *E04B 1/19* (2013.01); *B64C 1/08* (2013.01); *E04B 1/1909* (2013.01); *F16C 11/06* (2013.01);
(Continued)

(58) Field of Classification Search
CPC .... E04B 1/1903; E04B 1/1906; E04B 1/1909; E04B 2001/1942; E04B 2001/1957;
(Continued)

(56) References Cited

U.S. PATENT DOCUMENTS 1,002,229 A * 9/1911 Curtis .................. F22B 7/16
403/77
1,072,315 A * 9/1913 Cox ...................... F22B 7/16
403/77
(Continued)

FOREIGN PATENT DOCUMENTS

CA   2 237 020 A1   6/1997
CN   103147509 A   6/2013
(Continued)

OTHER PUBLICATIONS

"Additive Manufacturing." EOS: E-Manufacturing Solutions. Jul. 26, 2014, [online], [retrieved on Apr. 12, 2018] Retrieved from the Internet <URL: https://web.archive.org/web/20140726021145/https:// www.eos.info/additive_manufacturing/for_technology_interested>.*

(Continued)

*Primary Examiner* — Josh Skroupa
(74) *Attorney, Agent, or Firm* — Jenkins, Wilson, Taylor & Hunt, P.A.

(57) ABSTRACT

A rotary joint includes a socket rod having a socket rod flange with a basically spheroid concave bearing surface at a first end, a housing nut encircling the socket rod and having a threaded wrenching head, and a ball rod having a basically spheroid convex bearing surface and threaded side walls around the bearing surface. A diameter of the threaded side walls of the ball rod corresponds to a diameter of the threaded wrenching head of the housing nut. First guiding tracks are on the concave bearing surface oriented into a first swivelling direction, the socket rod being swivable to the ball rod along the first guiding tracks into the first swivelling direction. Second guiding tracks are on the convex bearing surface and oriented into a second swivelling direction, the (Continued)

socket rod being swivellable to the ball rod along the second guiding tracks into the second swivelling direction.

13 Claims, 6 Drawing Sheets

(51) Int. Cl.
*B64C 1/08* (2006.01)
*B64C 1/00* (2006.01)
*E04C 3/04* (2006.01)

(52) U.S. Cl.
CPC ......... *B64C 1/00* (2013.01); *E04B 2001/1942* (2013.01); *E04B 2001/1969* (2013.01); *E04C 2003/0495* (2013.01); *Y10T 403/32213* (2015.01)

(58) Field of Classification Search
CPC .. E04B 2001/1969; F16B 7/182; F16B 7/185; F16C 11/0661; F16C 11/0695; F16C 11/106; F16D 3/04; F16D 3/18; Y10T 403/32065; Y10T 403/32196; Y10T 403/32204; Y10T 403/32213; Y10T 403/32655; Y10T 403/32672; Y10T 403/32681; Y10T 403/32737; Y10T 403/341
USPC ..... 403/60, 76–78, 125, 127, 128, 135, 170; 464/102–105, 149
See application file for complete search history.

(56) References Cited

U.S. PATENT DOCUMENTS

| | | | | |
|---|---|---|---|---|
| 2,900,196 A * | 8/1959 | Nienke | ................... | B60G 7/005 403/77 |
| 3,338,585 A * | 8/1967 | Poorman | ................. | B23B 31/08 464/105 |
| 3,414,302 A * | 12/1968 | Priest | .................. | F16C 11/0661 403/125 |
| 3,864,049 A * | 2/1975 | Ono | ....................... | E04B 1/1906 403/171 |
| 3,958,904 A * | 5/1976 | Rusbach | ............... | F16C 11/106 403/90 |
| 4,037,884 A | 7/1977 | Bachinger | | |
| 4,161,088 A | 7/1979 | Gugliotta et al. | | |
| 4,273,461 A * | 6/1981 | Kjellstrand | ......... | F16C 11/0661 403/125 |
| 4,511,276 A * | 4/1985 | Doutt | .................. | F16C 11/0661 403/135 |
| 4,626,123 A | 12/1986 | Brown | | |
| 4,650,361 A | 3/1987 | Seuster | | |
| 4,796,389 A * | 1/1989 | Bini | ...................... | E04B 1/1906 52/2.26 |
| 5,088,852 A * | 2/1992 | Davister | ............... | E04B 1/1906 403/143 |
| 5,101,607 A | 4/1992 | Staeger | | |
| 5,115,725 A * | 5/1992 | Horiuchi | ............. | F02B 23/0672 403/125 |
| 5,413,031 A * | 5/1995 | Kohlmeyer | .......... | B23Q 1/5462 403/122 |
| 5,711,709 A * | 1/1998 | McCoy | ................... | F16B 7/182 464/106 |
| 6,622,447 B1 | 9/2003 | Kessler | | |
| 8,033,920 B1 | 10/2011 | Benson | | |
| 8,246,266 B2 | 8/2012 | Lang et al. | | |
| 8,679,275 B2 | 3/2014 | Schalla et al. | | |
| 9,615,564 B2 * | 4/2017 | Liney | ..................... | A01K 97/10 |
| 9,797,124 B2 | 10/2017 | Zhou et al. | | |
| 2006/0175501 A1 * | 8/2006 | Richter | ............... | F16C 11/0661 248/288.31 |
| 2015/0167288 A1 * | 6/2015 | Harkin | .................. | E04B 1/1903 403/107 |
| 2016/0348711 A1 | 12/2016 | Benthien et al. | | |
| 2017/0276184 A1 * | 9/2017 | Leiseder | ................. | F16D 3/185 |

FOREIGN PATENT DOCUMENTS

| | | | | |
|---|---|---|---|---|
| CN | 103643742 A | | 3/2014 | |
| DE | 24 51 658 A1 | | 5/1976 | |
| DE | 37 36 784 A1 | | 5/1989 | |
| DE | 38 00 547 A1 | | 7/1989 | |
| DE | 102004038503 A1 * | | 2/2006 | ............... F16D 3/18 |
| EP | 0 147 669 A2 | | 7/1985 | |
| EP | 0 986 685 B1 | | 3/2000 | |
| EP | 1 358 392 B1 | | 11/2003 | |
| EP | 2 875 938 A1 | | 5/2015 | |
| EP | 3 098 463 B1 | | 3/2018 | |
| FR | 509657 A * | | 11/1920 | ............ F16C 11/106 |
| FR | 901 628 A | | 8/1945 | |
| FR | 1210093 A * | | 3/1960 | .......... F16C 11/0661 |
| GB | 1464777 A * | | 2/1977 | ............ E04B 1/1903 |
| GB | 2077347 A * | | 12/1981 | .......... F16C 11/0661 |
| GB | 2 503 422 A | | 1/2014 | |
| WO | WO 03/054401 A1 | | 7/2003 | |
| WO | WO 2014/006422 A2 | | 1/2014 | |

OTHER PUBLICATIONS

European Office Action for European Application 15 182 771.4 dated Mar. 28, 2018.
European Search Report for EP 15 182 771.4 dated Feb. 15, 2016.
Extended European Search Report for Application No. 15 16 9224 dated Dec. 7, 2015.
Chinese Office Action for Application No. 201610348268.3 dated Feb. 14, 2018.
Chinese Office Action for Application No. 201610348268.6 dated Sep. 11, 2018.
Non-Final Office Action for U.S. Appl. No. 15/164,486 dated Dec. 10, 2018.

* cited by examiner

ROTARY JOINT, FRAMEWORK CONSTRUCTION KIT, FRAMEWORK WITH ROTARY JOINTS AND METHOD FOR MANUFACTURING A ROTARY JOINT

CROSS-REFERENCE TO RELATED APPLICATION

This application claims priority to EP 15 182 771.4 filed Aug. 27, 2015, the entire disclosure of which is incorporated by reference herein.

TECHNICAL FIELD

The present disclosure pertains to rotary joints, framework construction kits employing rotary joints, frameworks with rotary joints and methods for manufacturing rotary joints.

BACKGROUND

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam. Such struts may be employed in three-dimensional truss structures, as for example disclosed in documents EP 0 986 685 B1 or EP 1 358 392 B1.

Local load introduction into such beams or frames may, however, lead to torsional moments that are introduced into the attachment joints of the struts with the longitudinal support bars. Such torsional moments may in turn lead to additional moments within the longitudinal support bars that will have to be compensated for by local strengthening means, thereby nullifying some or all of the weight advantages gained.

Document U.S. Pat. No. 6,622,447 B1 discloses a modular structural system for building models and structures, using a plurality of connector hub members with spherical symmetry, and a plurality of strut members with longitudinal symmetry, wherein the strut members are removably engageable with the connector hub members placing the strut members in corresponding radial and tangential positions relative to the connector hub members.

Document CA 2 237 020 A1 and DE 38 00 547 A1 each disclose a set of structural elements for producing supporting structures, using supporting bars and cylindrical connecting elements for insertion heads provided on the end sides of the supporting bars.

Document DE 37 36 784 A1 discloses a node-truss system with rod-shaped elements which are pivotally connected to node bodies. Document U.S. Pat. No. 4,161,088 A discloses a pipe-and-ball truss array in which the outer chord of the truss array comprises an outer hollow pipe element having a structural tee element extending radially outward from the outer surface thereof in a plane normal to the plane in which the deck surface is to be supported on the truss array and an inner rod running through the pipe along the longitudinal axis thereof. A hollow substantially ball-like member, such as a hollow spherical member, is provided which is common to a plurality of truss members which truss members are joined to the spherical member by bolting.

Depending on the specific application, it may be advantageous to mount rods or struts via joints inside a framework in such a way that rotations of the rods or struts around their longitudinal axes within the respective joints are completely or at least partially prohibited. The joints may particularly function in way similar to universal joints with rotational/torque stiffness. In some applications, it may be further advantageous to provide frameworks with rod- or strut-like connections that are adjustable in length. Such adjustable connections may for example be employed for tolerance compensation of general framework structures or, for example, for moving certain parts of a vehicle with respect to other parts of the vehicle, e.g. aircraft flaps. Other applications, particularly in the aeronautics field, that rely on adjustable framework connections deal for example with adaptable structures, so-called morphing structures, e.g. adaptable aircraft wings with variable geometry and shape that consist of adjustable frameworks.

SUMMARY

It is one of the ideas of the disclosure herein to provide solutions for constructing frameworks that compensate additional torsional moments coupled into the joints of the frameworks in an efficient and weight saving manner, and that allow for a quick installation with a minimum number of individual parts to be mounted and fixed.

According to a first aspect of the disclosure herein, a rotary joint comprises a socket rod having a socket rod flange with a basically (at least partly) spheroid concave bearing surface at a first end, a housing nut encircling the socket rod and having a threaded wrenching head, and a ball rod having a basically spheroid convex bearing surface and threaded side walls around the bearing surface. A diameter of the threaded side walls of the ball rod corresponds to a diameter of the threaded wrenching head of the housing nut. A plurality of first guiding tracks are arranged on the concave bearing surface and are oriented into a first swivelling direction, the socket rod being swivable (or swivellable) with respect to the ball rod along the first guiding tracks into the first swivelling direction. A plurality of second guiding tracks are arranged on the convex bearing surface and are oriented into a second swivelling direction, the socket rod being swivable with respect to the ball rod along the second guiding tracks into the second swivelling direction.

According to a second aspect of the disclosure herein, a framework construction kit comprises at least one rotary joint according to the first aspect of the disclosure herein and at least one interconnection strut connected to a second end of the socket rod of the at least one rotary joint or connected to the ball rod of the at least one rotary joint.

According to a third aspect of the disclosure herein, a framework comprises a plurality of rotary joints according to the first aspect of the disclosure herein attached to a plurality of bearing structures and a plurality of interconnection struts, each connected to a socket rod or a ball rod of the plurality of rotary joints.

According to a fourth aspect of the disclosure herein, a method for manufacturing a rotary joint comprises forming a socket rod having a socket rod flange with a basically spheroid concave bearing surface at a first end using a 3D printing or additive manufacturing, AM, technique. The method further comprises forming a housing nut encircling the socket rod and having a threaded wrenching head using a 3D printing or AM technique. The method further comprises forming a ball rod having a basically spheroid convex bearing surface and threaded side walls around the bearing surface using a 3D printing or AM technique. The method further comprises threadingly engaging the threaded wrenching head of the housing nut with the threaded side walls of the ball rod, thereby housing the socket rod flange between the housing nut and the ball rod. A plurality of first guiding tracks are arranged on the concave bearing surface and are oriented into a first swivelling direction, the socket rod being swivable with respect to the ball rod along the first guiding tracks into the first swivelling direction. A plurality of second guiding tracks are arranged on the convex bearing surface and are oriented into a second swivelling direction, the socket rod being swivable with respect to the ball rod along the second guiding tracks into the second swivelling direction.

One of the ideas on which the present disclosure is based is to improve the connection points of a framework made up of struts or rods by employing rotary joints inspired by a ball-and-socket joint type. The stationary connection part is formed by a single protruding ball rod that has a basically (at least partly) spheroid convex outer surface. The side walls of the ball rod around the convex outer surface are provided with a (cylindrically) threaded engagement surface for engagement with a housing nut. The movable connection part is formed by a socket rod that has a basically (at least partly) spheroid concave outer surface. The basic shape of the concave outer surface principally corresponds to the shape of the convex outer surface of the stationary connection part so that both connection parts may be brought in contact with each other and the touching convex and concave outer surface may move in a sliding manner with respect to each other, similar to a ball-and-socket connection.

In order to restrain rotation of the movable connection part around its longitudinal axis with respect to the stationary connection part, a plurality of first guiding tracks are arranged on the concave bearing surface of the movable connection part and are oriented into a first swivelling direction so that they block any rotation of the movable connection part around its longitudinal axis but allow the movable connection part to swivel into a first swivelling direction with respect to the stationary connection part. Similarly, a plurality of second guiding tracks are arranged on the convex bearing surface of the stationary connection part and are oriented into a second swivelling direction so that they block any rotation of the movable connection part around its longitudinal axis but allow the movable connection part to swivel into a second swivelling direction. The first guiding tracks are arranged on the concave bearing surface of the movable connection part in such a way that they cover at least parts of the surface. However, the first guiding tracks may cover the complete concave bearing surface of the movable connection part. In a similar vein, the second guiding tracks are arranged on the convex bearing surface of the stationary conn in such a way that they cover at least parts of the surface. The first swivelling direction and the second swivelling direction can be the same or different, hence it is possible to either provide one single swivelling degree of freedom or alternatively two independent swivelling degrees of freedoms. The second case opens up the possibility to swivel the movable connection member into any direction perpendicular to its longitudinal axis. Thus in this case, the rotary joint according to the present disclosure can function in a way similar to a "smooth" ball-and-socket connection without any guiding tracks, i.e. it can swivel into any perpendicular direction with respect to its longitudinal axis, with the difference to a smooth ball-and-socket connection that in the present case rotational stiffness (i.e. torque stiffness) is achieved.

The first swivelling direction may be equal to the second swivelling direction. In this case, the first guiding tracks of the concave bearing surface of the movable connection part may be slidably interlocked with the second guiding tracks of the convex bearing surface of the stationary connection part.

The first swivelling direction may be unequal to the second swivelling direction, e.g. the first swivelling direction may be perpendicular to the second swivelling direction. In this case, a concave-convex sliding washer may be provided in between the movable connection part and the stationary connection part. The concave-convex sliding washer may have a basically (at least partly) spheroid convex washer surface and a basically (at least partly) spheroid concave washer surface. The convex washer surface may be covered with a plurality of first washer guiding tracks oriented into the first swivelling direction and the concave washer surface may be covered with a plurality of second washer guiding tracks oriented into the second swivelling direction. The first guiding tracks of the concave bearing surface of the movable connection part may then be slidably interlocked with the first washer guiding tracks of the convex washer surface of the concave-convex sliding washer and the second guiding tracks of the convex bearing surface of the stationary connection part may be slidably interlocked with the second washer guiding tracks of the concave washer surface of the concave-convex sliding washer.

Along the contacting surfaces of the stationary connection part ("ball" part) and the movable connection part ("socket" part) a swivelling motion of the socket rod with respect to the attached structure of the stationary connection part may thus be realized. In case that the first swivelling direction is unequal to the second swivelling direction, in particular if the first swivelling direction is basically perpendicular to the second swivelling direction, the socket part may swivel into any directions perpendicular to its longitudinal orientation by moving into both swivelling directions. Thus, any lateral moment on the socket rod with respect to the contacting surfaces of the rotary joint will lead to a shifting movement of the socket rod along the outer surface of the stationary connection part. Thus, any bending moment acting perpendicular to the orientation of the socket rod will vanish with respect to the rotary joint due to the compensating sliding movement of the movable connection part with respect to the stationary connection part. This means in turn that the rotary joint will be essentially free of any bending moments that would otherwise be brought into the rotary joints. The axes of struts or rods coupled to such rotary joints will always be oriented towards the center of the rotary joint, thereby balancing out the rotary joint optimally under any loading situation on the struts/rods.

In order to restrain the movable connection part to not detach from the convex outer surface of the stationary connection part a housing nut is slipped on the socket rod. The housing nut has an inner thread on its inner walls corresponding to the (cylindrically) threaded engagement surface of the stationary connection part. The movable connection part may have a generally tapered shape, i.e. the end portion with the concave outer surface may be flanged with respect to the extending rod portion. The opening of the housing nut may have a diameter that is larger than the diameter of the extending rod portion, but smaller than the diameter of the flanged end portion. Therefore, when the housing nut is threadingly engaging the threaded engagement surface of the stationary connection part, the housing nut clamps the flanged end portion between the rim of the housing nut opening and the stationary connection part so that the movable connection part will be secured against detachment from the stationary connection part, i.e. a linear movement of the movable connection part in the direction of the extending rod portion away from the stationary connection part will be mechanically restrained.

The rotational stiffness of the rotary joint according to the present disclosure may further be utilized in a framework construction kit with at least one rotary joint according to the disclosure herein. A stepper drive (or motor) may be length-adjustably connecting the socket rod or the ball rod of one rotary joint with the socket rod or the ball rod of another rotary joint. In this case a stepper drive may for example connect the socket rods of two rotary joints with each other at a respective second end of each socket rod. The socket rods may be configured to swivel into any directions perpendicular to the longitudinal axis within the respective rotary joints (e.g. in case the first swivelling direction is perpendicular to the second swivelling direction). At the same time the stepper drive may be configured to adjust the length of the rotary joint connection. Such a stepper drive configuration is readily realizable as the rotary joints of the framework construction kit according to the present disclosure feature torque/rotation stiffness and thus any torque acting on one of the socket rods (or alternatively the ball rods) may be used to move a stepper drive with respect to the socket rod and the rotary joint. The stepper drive or stepper motor may for example comprises a female-threaded socket rod duct, which is engaged, at a first stepper drive end portion, with a threaded shank of the socket rod of one of the rotary joints and, at a second stepper drive end portion, with a threaded shank of the socket rod of another one of the rotary joints. Hence, by properly configuring the threading of the socket rods and the socket rod duct, the stepper drive may be configured to either "drive out" both socket rods to extend the length of the connection between both rotary joints or "drive in" both socket rods to shorten the length of the connection between both rotary joints. In an similar fashion such stepper drives may equally well length-adjustably connect appropriately configured ball rods of rotary joints.

The framework construction kit may further contain a plurality of interconnection struts, each being connected to a second end of the socket rod of one rotary joint or connected to the ball rod of one rotary joint. With such a framework construction kit a framework according to the present disclosure may be built, wherein a plurality of rotary joints are attached to a plurality of bearing structures and are interconnected with each other by a plurality of interconnection struts that are each connected to a socket rod or a ball rod of the plurality of rotary joints. In addition, such a framework may also comprise a plurality of stepper drives, each length-adjustably connecting the socket rod or the ball rod of one rotary joint with the socket rod or the ball rod of another rotary joint.

Particularly advantageous may additionally be the reduction of costs, weight, lead time, part count and manufacturing complexity coming along with employing any kind of layer manufacturing technology when designing the components of the framework construction kit, specifically the rotary joints.

Advantageous embodiments and improvements of the present disclosure are disclosed herein.

According to an embodiment of the rotary joint, the housing nut has a nut hole on the opposite side of the threaded wrenching head. The diameter of the nut hole may be larger than the diameter of the socket rod, but smaller than the diameter of the socket rod flange. This way, the socket rod flange is given enough leeway to swivel along the ball rod bearing surface, but is not able to detach from the ball rod perpendicular to its surface.

According to another embodiment of the rotary joint, the curvature of the concave bearing surface of the socket rod flange corresponds to the curvature of the convex bearing surface of the ball rod. This enables the implementation of a smooth contact between the two movable parts, thereby reducing the inner friction within the joint.

According to another embodiment of the rotary joint, the curvature of the concave bearing surface of the socket rod flange corresponds to the curvature of the convex washer surface of the concave-convex sliding washer and the curvature of the convex bearing surface of the ball rod corresponds to the curvature of the concave washer surface of the concave-convex sliding washer. As in the embodiment above, this enables the implementation of a smooth contact between the movable parts, thereby reducing the inner friction within the joint.

According to another embodiment of the rotary joint, the socket rod comprises a threaded shank at a second end opposite to the first end. The socket rod may additionally comprise a wrenching contour arranged on the circumference of the socket rod between the socket rod flange and the threaded shank. With the threaded shank, the socket rod may be connected to a stepper drive and the length of the protruding part of the socket rod with respect to the stepper drive may be continuously adjusted. Alternatively it may be connected to an interconnection strut and the length of the protruding part of the socket rod with respect to the interconnection strut may be continuously adjusted. This advantageously leads to greater flexibility in constructing frameworks using struts of standardized lengths.

According to another embodiment of the rotary joint, a clamping bracket is sleeved at least partly over the housing nut and the ball rod to interlock the housing nut with the ball rod. The clamping bracket may hold them together in a clamping fashion. For this both the housing nut and the ball rod may be configured, for example, with a plurality of engaging teeth placed in an annular arrangement around both components and the clamping bracket may be configured correspondingly to engage the teeth.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

FIG. 3b schematically illustrates two different cross-sectional views of the rotary joint of FIG. 3a.

FIG. 4 schematically illustrates a cross-sectional view of a length-adjustable connection of two rotary joints according to FIG. 2a.

DETAILED DESCRIPTION

Figure 1:
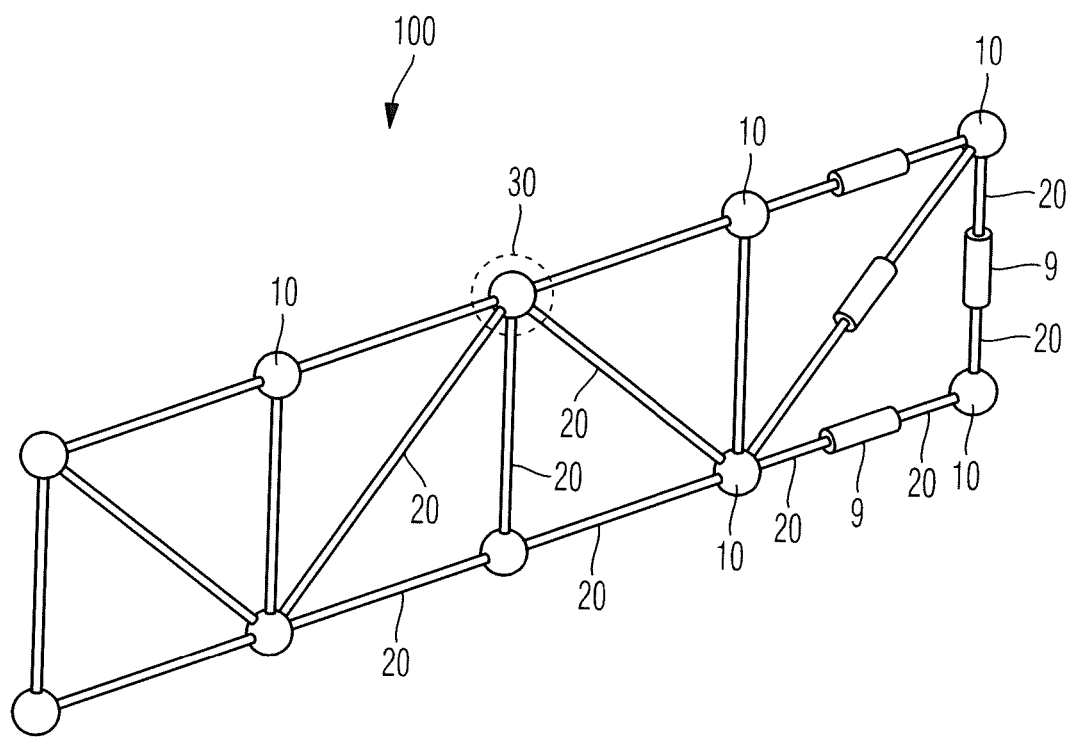
FIG. 1 schematically illustrates a framework with rotary joints according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modeling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

FIG. 1 schematically illustrates a framework 100 with rotary joints 10 according to an embodiment of the disclosure herein. The framework 100 comprises a multitude of laterally and diagonally running rods or struts 20 which may be interconnected among each other at joint regions 30 via rotary joints 10. Each of the joint regions 30 may have a rotary joint 10 that is connected to each of the end portions of the struts/rods 20 reaching into the particular joint region 30. In addition, pairs of rotary joints 10 may be length-adjustably connected to each other via a pair of interconnecting rods or struts 20 and a stepper drive 9 positioned in between the struts 20. Each pair of struts 20 may be mounted to the respective stepper drive 9 in such a way that the length of the two struts 20 forming a connection between two rotary joints 10 is adjustable by the stepper drive 9 and hence can be extended or shortened. The framework 100 may have a generally two-dimensional layout, i.e. the struts 20 and joints 10 are substantially lying in one plane of extension which may be flat or arcuate. In the exemplary case of FIG. 1 the framework 100 takes on the shape of a frame having two substantially parallel beams (running from bottom left to top right in the drawing) formed by a first subset of the interconnecting struts 20 and diagonally staggered cross-beams between the two substantially parallel beams formed by a second subset of the interconnecting struts 20.

The framework 100 may also have a generally three-dimensional layout, i.e. for each first plane of extension defined by a subset of struts 20, another subset of struts 20 is connected to rotary joints 10 in a manner that defines at least one further second plane of extension being arranged under a non-zero angle with respect to the first plane of extension. Rotary joints 10 as disclosed hereinforth generally denote spheroid joints or socket type joints where a stationary part having a basically spheroid or at least partly spheroid convex outer bearing surface is in sliding contact with a basically spheroid least partly spheroid concave counter-bearing surface of a hinged part. The stationary part may be a joint member, such as a bracket, fixture or holder, while the hinged and movable part may be a strut, rod or other truss element, such as a strut 20 as shown in FIG. 1.

The number of struts 20 being interconnected in each joint region 30 may vary and may in particular be not limited to the explicit number of two, three or five as exemplarily shown in FIG. 1. Specifically, the number of interconnecting struts 2 at each joint region 30 may take on any number greater than one. To that end, the rotary joints 10 employed at each joint region 30 may have a number of interconnection assemblies that is at least equal or greater than the number of interconnecting struts 20. Moreover, the kind, type and specific design of the rotary joints 10 may vary depending on the particular joint region 30 they are employed at.

Generally, a set of rotary joints 10, a set of interconnecting struts 20 and a set of stepper drives 9 may form a framework construction kit, which may be used to construct different frameworks of varying extension, size, shape and complexity. Thus, while it may be favorable to use as few different types of rotary joints 10 and as few different types of interconnecting struts 20 as possible to guarantee high flexibility in framework design and low implementation effort, it may as well be possible to use more different types of rotary joints 10 and/or interconnecting struts 20 in order to specifically be able to tailor the framework construction kit to the particular needs and constraints of the framework and its intended field of application.

The frameworks, rotary joints, and stepper drives disclosed hereinforth may be used in a lot of applications, including—but not limited to—constructions of frames, stringers, crossbeams, wings in aircraft, interior design, bridge building, vehicle carriages, civil engineering, applications for children's toys and similar. A particular application pertains to the construction of frameworks in aircraft. Such frameworks include connection rods for bracing a fuselage structure of an aircraft, structurally reinforcing a fuselage structure, for fastening a component on the fuselage structure, and/or for creating adjustable or morphing aircraft structures.

Conventional connection rods, as for example "Samer rods" or "Samer-type rods", often have a central strut portion between two end portions used to interconnect the connection rod between two joints or brackets. Conventional Samer rods generally have a hollow-cylindrical central portion that may taper towards the end regions. The end regions may have a shank and eyes arranged at shank ends on both sides for connecting the Samer rod to the fuselage structure. In order to link the Samer rod to the structure of the aircraft, a clamp or a forked bracket attached to the structure. The clamp (or bracket) has a bore which may align with the eye of a shank end so that a bolt introduced through the bore and the eye pivotably couples the Samer rod to the clamp (or bracket).

In contrast to such conventional Samer rods, the linking mechanism of struts 20 as illustrated herein greatly reduces the number of individual parts used for mechanically linking the struts 20 to a structure or framework, such as the framework 100 in FIG. 1. In addition, the linking mechanism according to the present disclosure offers the possibility to adjust the lengths of rod/strut connections within a framework or structure and thus makes it possible to build flexible frameworks that can be adapted to the needs of the specific use case. Additionally, the usage of less individual parts for the struts 20 and the rotary joints 10 requires less effort in positioning the struts 20 with respect to the brackets or clamps to which are to be fastened. This, in turn, leads to lower manufacturing costs and higher throughput in constructing frameworks.

The following two groups of figures, i.e. FIGS. 2a through 2c and FIGS. 3a through 3b, respectively, exemplarily show schematic illustrations of two different embodiments of rotary joints 10 as they may be used in a framework 100 like the one shown in FIG. 1. FIG. 4 on the other hand illustrates one exemplary embodiment of a connection between two rotary joints 10 with a length that can be adjusted by a stepper drive 9 being positioned in between the two rotary joints 10 and being connected to the socket rod of each of the rotary joints 10. The exemplary embodiment shown in FIGS. 2a through 2c (explained in more detail below) exhibits two swivelling degrees of freedom of a socket rod 2 with respect to a ball rod 6 of the rotary joint 10, whereas the embodiment in FIGS. 3a to 3b (explained in more detail below) features only one swivelling degree of freedom for the socket rod 2 with respect to the ball rod 6. As an example, the ball rods 6 are connected in all of these figures with an interconnecting strut 20. However, according to the disclosure herein, also the socket rods 2 may alternatively or additionally be connected to interconnecting struts 20. Such an interconnecting strut 20 (not shown in detail in these figures) may for example comprise a trussed beam having a plurality of substantially longitudinally running chord members and a plurality of web members spanning between the chord members.

Figure 2B:
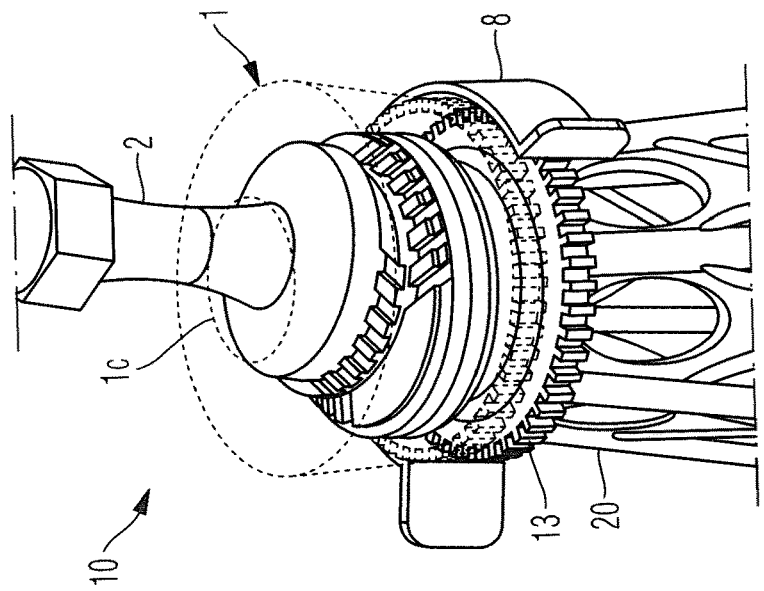
FIG. 2b schematically illustrates a front view of the rotary joint of FIG. 2a with mounted housing nut and clamping bracket.
Figure 2A:
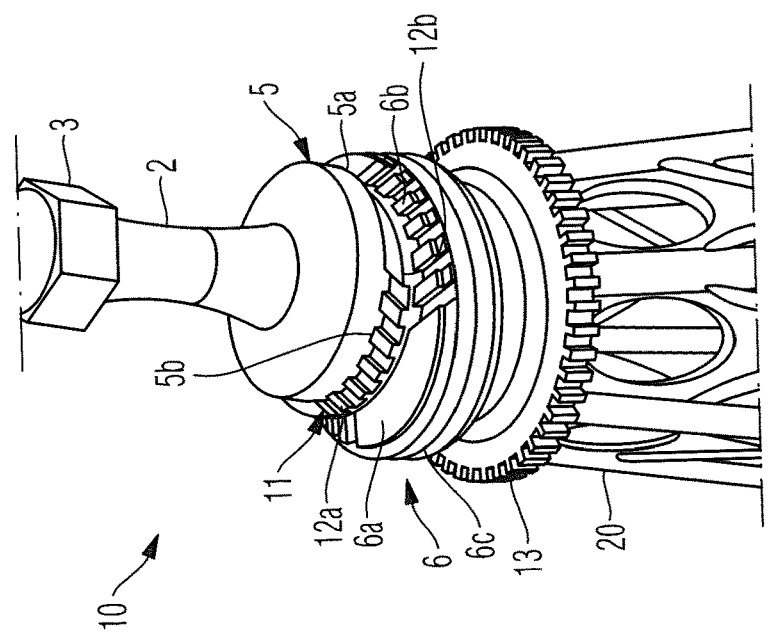
FIG. 2a schematically illustrates a front view of a rotary joint without housing nut and with the socket rod swivelled out of its baseline position according to another embodiment of the disclosure herein.
Figure 2C:
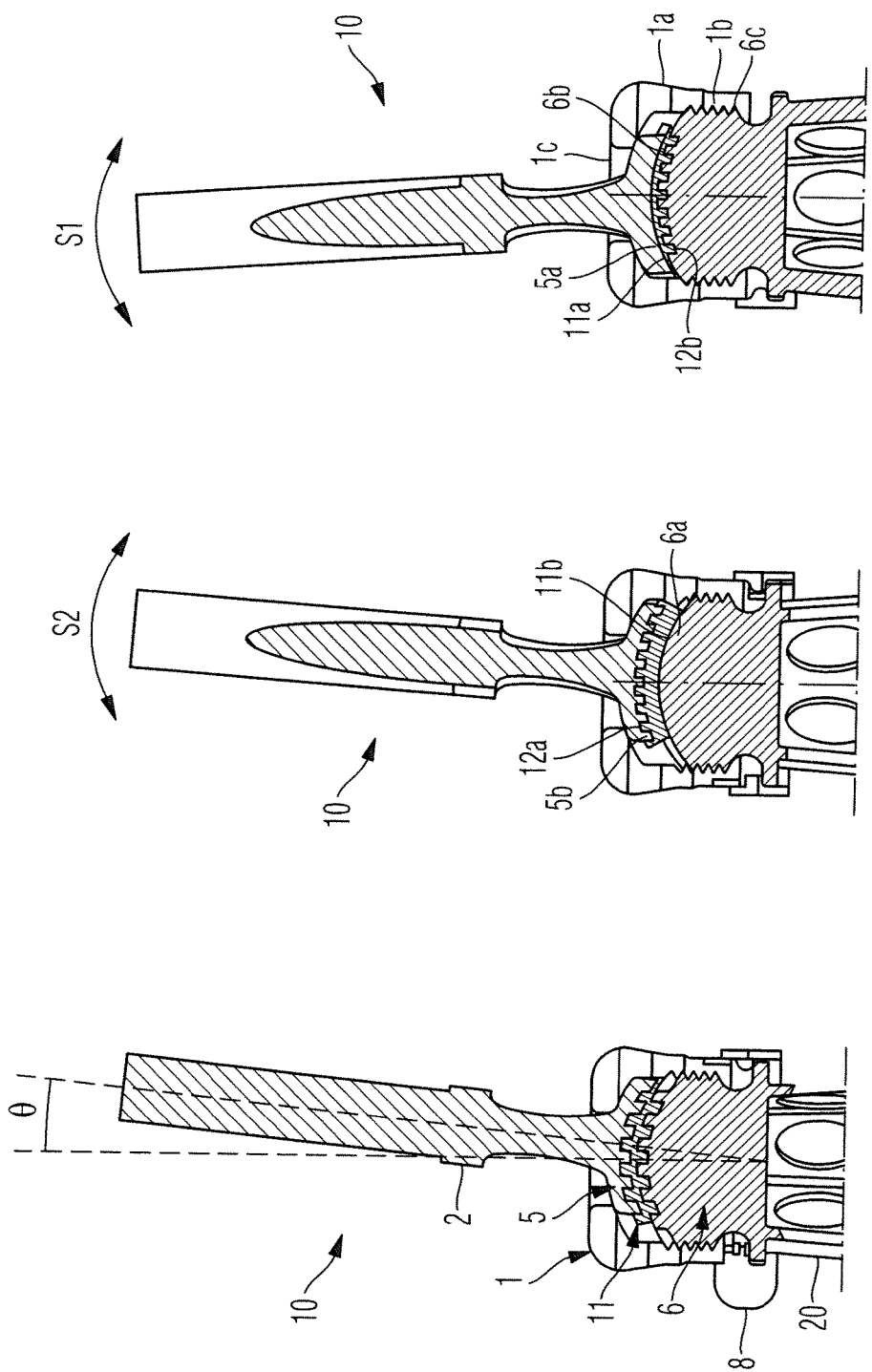
FIG. 2c schematically illustrates three different cross-sectional views of the rotary joint of FIG. 2b.

FIG. 2a schematically illustrates a front view of a rotary joint 10 without housing nut 1 and with a socket rod 2 swivelled out of its baseline position according to another embodiment of the disclosure herein. FIG. 2b schematically illustrates a front view of the rotary joint 10 of FIG. 2a with a mounted housing nut 1 and a mounted clamping bracket 8. FIG. 2c finally schematically illustrates three different cross-sectional views of the rotary joint 10 of FIG. 2b.

The rotary joint 10 comprises a socket rod 2, for example a generally cylindrical socket rod with a tapered middle portion. At a first end of the socket rod 2, the socket rod 2 has a socket rod flange 5 attached thereto. The socket rod flange 5 may be integrally fabricated with the middle portion of the socket rod 2. The socket rod flange 5 has a basically spheroid concave bearing surface 5a at a first end, i.e. the bearing surface 5a has a curvature where the radius of the curvature lies outside the socket rod 2.

The rotary joint 10 further comprises a ball rod 6 that has a ball rod head with threaded side walls 6c and an at least partly spheroid convex bearing surface 6a, i.e. the bearing surface 6a has a curvature where the radius of the curvature lies inside the ball rod 6.

The concave bearing surface 5a is (at least partially) covered with a plurality of first guiding tracks 5b oriented into a first swivelling direction S1. The socket rod 2 is being swivable with respect to the ball rod 6 along the first guiding tracks 5b into the first swivelling direction S1. In a similar vein, the convex bearing surface 6a is (at least partially) covered with a plurality of second guiding tracks 6b oriented into a second swivelling direction S2. The socket rod 2 is being swivable with respect to the ball rod 6 along the second guiding tracks 6b into the second swivelling direction S2.

The rotary joint 10 further comprises a concave-convex sliding washer 11 with a basically spheroid convex washer surface 11a and a basically spheroid concave washer surface 11b. Here, the convex washer surface 11a is covered with a plurality of first washer guiding tracks 12a oriented into the first swivelling direction S1. In addition, the concave washer surface 11b is covered with a plurality of second washer guiding tracks 12b oriented into the second swivelling direction S2.

The first swivelling direction S1 is arranged perpendicular to the second swivelling direction S2. The first guiding tracks 5b of the concave bearing surface 5a of the socket rod flange 5 are slidably interlocked with the first washer guiding tracks 12a of the convex washer surface 11a of the concave-convex sliding washer 11. Similarly, the second guiding tracks 6b of the convex bearing surface 6a of the ball rod 6 are slidably interlocked with the second washer guiding tracks 12b of the concave washer surface 11b of the concave-convex sliding washer 11.

The curvature of the concave bearing surface 5a of the socket rod flange 5 corresponds to the curvature of the convex washer surface 11a of the concave-convex sliding washer 11. The curvature of the convex bearing surface 6a of the ball rod 6 corresponds to the curvature of the concave washer surface 11b of the concave-convex sliding washer 11. With this, a smooth contact between the socket rod 2 and the ball rod 6 is guaranteed, because smooth contacting areas between the socket rod flange 5 and the concave-convex sliding washer 11 as well as between the concave-convex sliding washer 11 and the ball rod 6 are provided.

For assembly of the rotary joint 10, the concave-convex sliding washer 11 is arranged between the socket rod flange 5 and the ball rod 6. Next, the concave bearing surface 5a of the socket rod flange 5 is brought into contact with the convex washer surface 11a such that the first guiding tracks 5b of the concave bearing surface 5a of the socket rod flange 5 are slidably interlocked with the first washer guiding tracks 12a. This means in particular that the first guiding tracks 5b run parallel to the first washer guiding tracks 12a. Similarly, the concave washer surface 11b is brought into contact with the convex bearing surface 6a of the ball rod 6 such that the second guiding tracks 6b of the convex bearing surface 6a of the ball rod 6 are slidably interlocked with the second washer guiding tracks 12b. Hence, the second guiding tracks 6b run parallel to the second washer tracks 12b.

In principle, a housing nut 1 is then guided in a further step over the socket rod flange 5 and threadingly engaged with the threaded side walls 6c of the ball rod 6. This provides a housing of the socket rod flange 5 between the inner hollow of the housing nut 1 and the ball rod 6. Here, the diameter of the threaded side walls 6c of the ball rod 6 corresponds to a diameter of the threaded wrenching head 1a of the housing nut 1. However, the housing nut 1 is omitted from FIG. 2a for the sake of clarity. FIG. 2b shows the same rotary joint 10 after the housing nut 1 is threadingly engaged with the ball rod 6.

The housing nut 1 may have a generally cylindrical shape with a threaded wrenching head 1a to encircle the socket rod 2. The threaded wrenching head 1a may have an angular contour, for example a hex contour for a wrenching tool to grip thereon and exert a torque onto the housing nut 1. The housing nut 1 has an opening on the flange side of the socket rod 2 the diameter of which exceeds the diameter of the opening on the opposite side of the housing nut 1. In other words, the housing nut 1 has a nut hole 1c on the opposite side of the threaded wrenching head 1a, the diameter of which is smaller than the diameter of the opening of the threaded wrenching head 1a. The threaded wrenching head 1a has a female-thread inner thread 1b formed on its inner walls.

The nut hole 1c is larger in diameter than the diameter of the socket rod 2 so that the housing nut 1 is able to be moved along the axis of extension of the socket rod 2. The socket rod flange 5, however, is formed with a larger diameter than the diameter of the nut hole 1c so that the housing nut 1 may not slip off the socket rod 2 over the socket rod flange 5.

The housing nut 1 is tightened up to a point where the socket rod flange 5, the concave-convex sliding washer 11, and the ball rod 6 are held in tight contact at the respective contacting surfaces 5a, 11a, 11b, and 6a. However, the tightening of the housing nut 1 is chosen in such a way that the socket rod flange 5 and the ball rod 6 are still able to move in sliding or swivelling motion S1, S2 along the first swivelling direction S1 and the second swivelling direction S2 with respect to each other, as shown in FIG. 2c. The swivelling motion S1, S2 will displace the socket rod 2 out of axis of the ball rod 6 by a swivelling angle θ. The maximum possible swivelling angle θ will be determined by the ratio between the nut hole 1c diameter and the height of the housing nut 1.

FIG. 2c shows three different cross-sectional views of the rotary joint 10 swivelled out of its baseline position by an angle θ. In the cross-sectional view on the right side of FIG. 2c, the second washer guiding tracks 12b and the second guiding tracks 6b—being interlocked with each other and running parallel—are arranged perpendicular to the plane of the figure. Hence, the first washer guiding tracks 12a and the first guiding tracks 5b—also being interlocked with each other and running parallel—are arranged parallel to the plane of the figure. The cross-sectional view in the middle of FIG. 2c shows the same rotary joint 10 but turned by 90 degrees. Hence in this case, the second washer guiding tracks 12b and the second guiding tracks 6b—being interlocked with each other and running parallel—are now arranged parallel to the plane of the figure, whereas the first washer guiding tracks 12a and the first guiding tracks 5b—also being interlocked with each other and running parallel—are arranged perpendicular to the plane of the figure. The cross-sectional view on the left of FIG. 2c finally schematically shows a general cross-section of the rotary joint 10 in a rotated position in between the drawings in the middle and the right of FIG. 2c.

In the embodiment shown in FIGS. 2a through 2c, the socket rod 2 may be swivelled into the two swivelling directions S1, S2 independently of each other. For example, the socket rod 2 may be swivelled into the first swivelling direction S1 (as shown in the right-hand cross-sectional view of FIG. 2c) along the first guiding tracks 5b and the first washer guiding tracks 12a. As another example, the socket rod 2 may be swivelled into the second swivelling direction S2 (as shown in the middle cross-sectional view of FIG. 2c) along the second guiding tracks 6b and the second washer guiding tracks 12b. However, the socket rod 2 may be also swivelled into both swivelling directions S1, S2 at the same time and thus may be swivelled out of its baseline position by a general angle θ.

Due to the arrangement and configuration of the guiding tracks 5b, 6b, 12a, 12b of the socket rod 2, the ball rod 5, and the concave-convex sliding washer 11, the rotary joint 10 functions in way similar to a universal joint with rotational/torque stiffness. This means that any rotations around the longitudinal axis of the socket rod 2 are prohibited by the guiding tracks 5b, 6b, 12a, 12b. On the other hand, the rotary joint 10 retains the swivelling functionality of a smooth ball-and-socket joint.

Coming back to the assembly of the rotary joint 10, a clamping bracket 8 may be sleeved at least partly over the housing nut 1 and the ball rod 6 in a further step (as shown in FIG. 2b) to tightly interlock the housing nut 1 with the ball rod 6. For this both the housing nut 1 and the ball rod 5 may be configured, for example, with a plurality of engaging teeth 13 placed in an annular arrangement around both components and the clamping bracket 8 may be configured correspondingly to engage the teeth 13. Such a clamping bracket 8 may for example prevent that the threaded engagement between the housing nut 1 and the ball rod 5 is accidentally loosened due to external influences like vibrations or other mechanical strain.

The ball rod 6 or the socket rod 2 may generally be attached to any bearing structure 7, such as a strut, a bracket, a holder, a support beam or any other suitable structure. It may also be possible to provide more than one ball rod 6 with different directions of extension to the same bearing structure 7 in order to provide for an interconnection node for multiple struts 20, for example.

The socket rod 2 of FIGS. 2a through 2c may have a threaded shank 4 with a socket rod thread (not shown in the figures, cf. FIG. 4). The threaded shank 4 may be located on an end portion opposite to the end portion having the socket rod flange 5. In the middle portion of the socket rod 5, a wrenching contour 3 may be arranged on the circumference of the socket rod 2. The wrenching contour 3 may for example be a series of angled surfaces, such as a hex, for wrenching tools to grip on the socket rod 2 and exert a torque on the socket rod 2 around its main axis of extension.

The threaded shank 4 may be used for connecting the socket rod 2 to an interconnection strut 20, such as for example a Samer rod, or a stepper drive 9, as shown in FIG.

4. The strut 20 or the stepper drive 9 may for this purpose have a corresponding female-threaded socket rod duct 9a located. The female-threaded socket rod duct 9a may be threadingly engaged with the threaded shank 4 of the socket rod 2. The threaded shank 4 of the socket rod 2 advantageously allows for adjusting the distance by which the socket rod 2 protrudes from the interconnecting strut 20 or the stepper drive 9, thereby enabling a framework constructed with rotary joints 10 and interconnection struts 20, such as a framework 100 of FIG. 1, to be flexibly designed with regard to strut lengths between different interconnecting nodes.

The function of the rotary joints 10 as shown and explained in conjunction with FIGS. 2a through 2c is to divert torsional moments acting on the struts 20 lateral to their main axis. Since the struts are able to swerve or give way along the contacting surfaces 5a and 6a of the ball-and-socket bearing, this swivelling motion of the struts 20 will always be able to compensate for any lateral moments acting on the struts 20. Thus, the force lines running along the main axis of the struts 20 will always intersect at the same force line intersection point in the center of the rotary joint 10, thereby not creating any net moment on the rotary joint 10 as a whole. As a consequence, the rotary joint 10 is free from torsional stress, leading to greater mechanical stability.

The framework construction kit is a cheap, extremely light and flexible system that allows for rapid construction and deconstruction of multiple structures of varying outer profile. The framework construction kit may for example be used to build bending beams that are essentially free from torsional moments in the interconnection joints. It allows for tolerance compensation and adjustment to flexible surfaces such as aircraft flaps or wings.

A particular advantage of the framework construction kit as disclosed, and in particular of the rotary joint 10 is the possibility to manufacture all parts using a 3D printing or Additive Manufacturing (AM) technique.

Figure 3A:
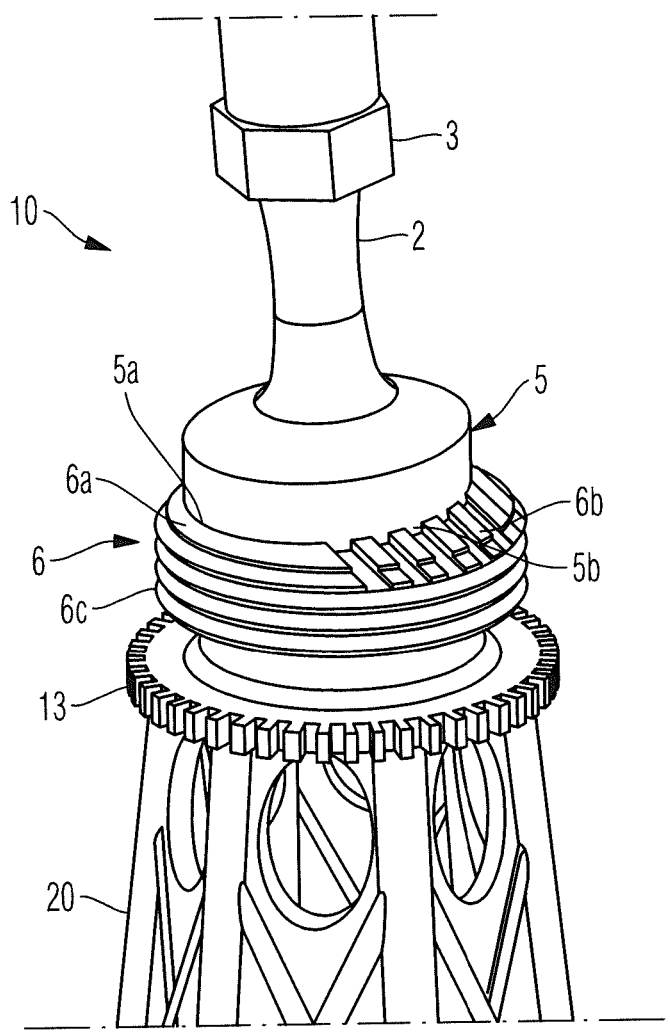
FIG. 3a schematically illustrates a front view of a rotary joint without housing nut and with the socket rod swivelled out of its baseline position according to yet another embodiment of the disclosure herein.
Figure 3B:
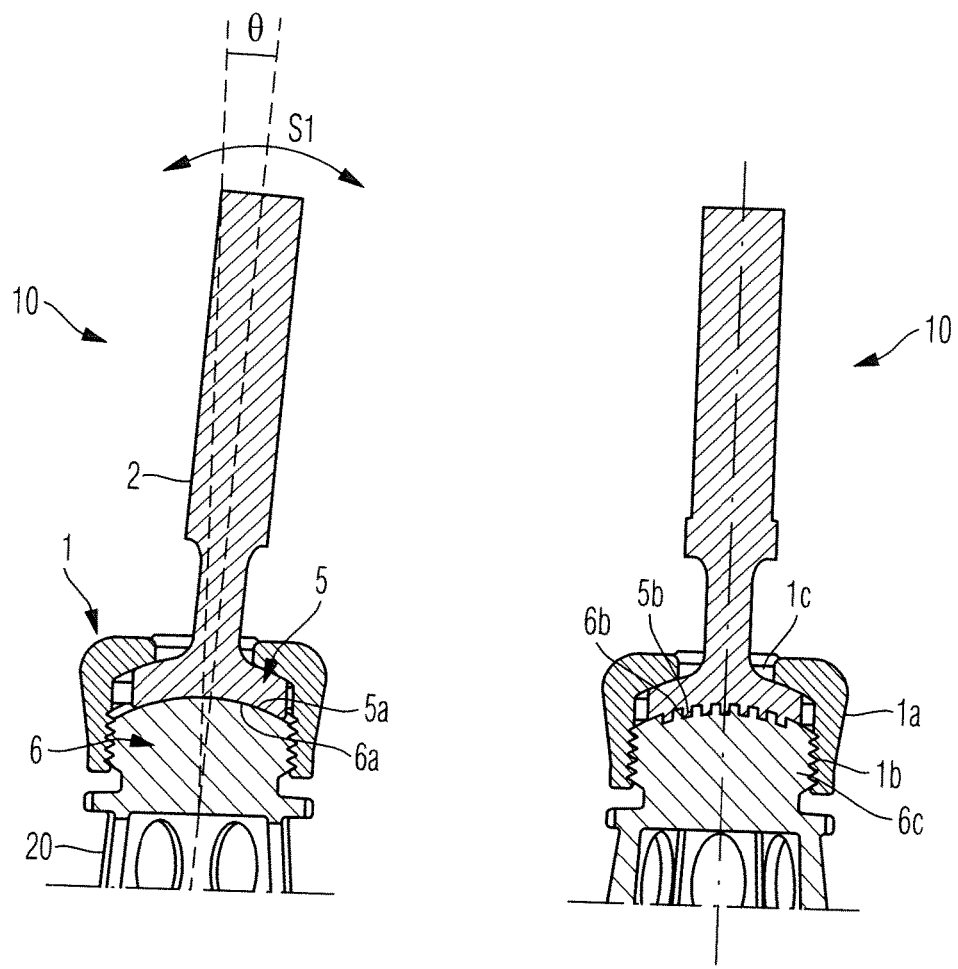
Figure 4:
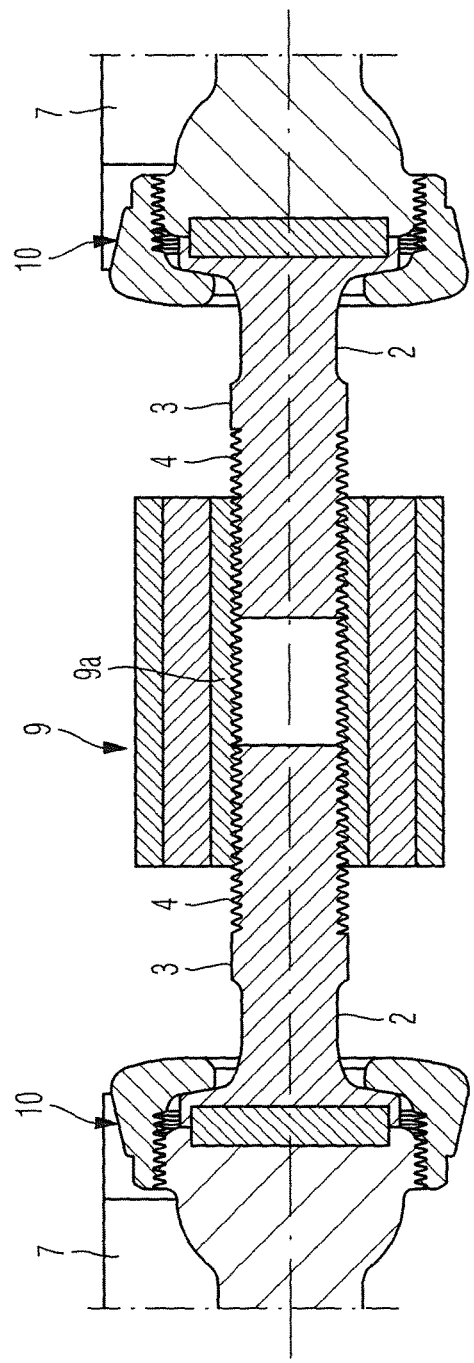

FIG. 3a schematically illustrates a front view of a rotary joint 10 without a housing nut 1 and with a socket rod 2 swivelled out of its baseline position according to yet another embodiment of the disclosure herein. FIG. 3b schematically illustrates two different cross-sectional views of the rotary joint 10 of FIG. 3a.

The rotary joint 10 in FIGS. 3a through 3b is basically very similar to the one described in detail in conjunction with FIGS. 2a through 2c. However, the rotary joint 10 of the embodiment shown in FIGS. 3a through 3b does not comprise a concave-convex sliding washer. Instead, the first guiding tracks 5b of the concave bearing surface 5a of the socket rod flange 5 are slidably interlocked with the second guiding tracks 6b of the convex bearing surface 6a of the ball rod 6. Hence, the first swivelling direction S1 is equal to the second swivelling direction S2 in this embodiment, that is the first guiding tracks 5b and the second guiding tracks 6b are arranged in parallel. In addition, the curvature of the concave bearing surface 5a of the socket rod flange 5 corresponds to the curvature of the convex bearing surface 6a of the ball rod 6 in this embodiment, as shown in detail in FIG. 3b.

The right-hand side of FIG. 3b shows a cross-section of the rotary joint 10 where the guiding tracks 5b, 6b run perpendicular to the plane of the figure. The left-hand side of FIG. 3b on the other hand shows the rotary joint 10 of the right-hand side after a rotation of 90 degrees, i.e. in this case the guiding tracks 5b, 6b are arranged in parallel to the plane of the figure. Consequently, the socket rod 2 of the rotary joint 10 has one swivelling degree of freedom and can only be swivelled along the direction of the guiding tracks 5b, 6b, as shown in the left-hand side of FIG. 3b.

FIG. 4 schematically illustrates a cross-sectional view of a length-adjustable connection of two rotary joints 10 according to FIG. 2a.

Principally, the rotary joint 10 connection shown in FIG. 4 can be accomplished with any rotary joint 10 configuration according to the present disclosure. As an example however, the connection is explained in conjunction with rotary joints 10 according to the embodiment shown in FIG. 2a. For simplicity, the rotary joints 10 are only schematically shown in FIG. 4. However, similarly to the rotary joint 10 of FIG. 2a they each comprise a socket rod 2 with a socket rod flange 5, a housing nut 1, a ball rod 5, as well as a concave-convex sliding washer 11 arranged in between the socket rod flange 5 and the ball rod 5. The ball rods 6 of the rotary joints 10 may generally be attached to any bearing structure 7, such as a strut, a bracket, a holder, a support beam or any other suitable structure.

Each socket rod 2 comprises a threaded shank 4 with a socket rod thread. The threaded shank 4 is located on an end portion opposite to the end portion having the socket rod flange 5. In the middle portion of the socket rod 5, a wrenching contour 3 is arranged on the circumference of the socket rod 2. The wrenching contour 3 may for example be a series of angled surfaces, such as a hex, for wrenching tools to grip on the socket rod 2 and exert a torque on the socket rod 2 around its main axis of extension.

A stepper drive 9 connects the socket rods 2 of the rotary joints 10 with each other. For this, the stepper drive 9 comprises a female-threaded socket rod duct 9a, which is engaged, at a first stepper drive end portion, with the threaded shank 4 of the socket rod 2 of one of the rotary joints 10 and, at a second stepper drive end portion, with the threaded shank 4 of the socket rod 2 of the other rotary joint 10.

Due to the rotational/torque stiffness of the rotary joints 10 the arrangement shown in FIG. 4 is able to adjust the length of the connection of the rotary joints 10. For this, the stepper drive may be configured to adjust the length of the rotary joint connection by either driving out both socket rods 2 and thus extend the length of the connection between both rotary joints 10 or driving in both socket rods 2 and hence shorten the length of the connection between both rotary joints 10. The adjustment of the connection length can be done either manually (e.g. by simply rotating a mechanical stepper drive 9) or, for example, automatically with an appropriately configured electrically operated stepper drive/motor 9.

Figure 5:
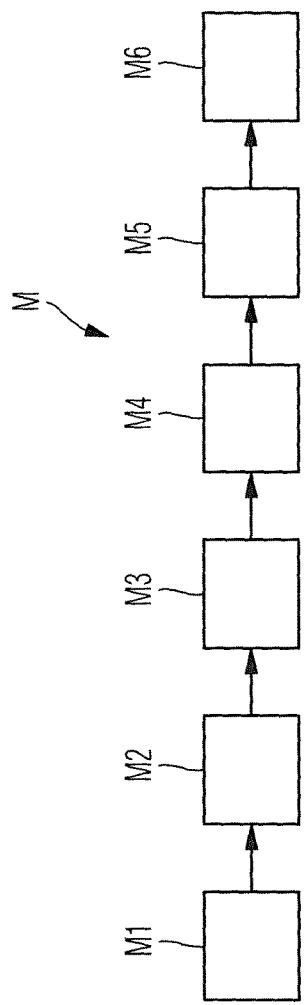
FIG. 5 shows a flow diagram of a method for manufacturing a rotary joint according to yet another embodiment of the disclosure herein.

FIG. 5 shows a flow diagram of a method M for manufacturing a rotary joint 10 according to yet another embodiment of the disclosure herein.

The method M comprises at M1 forming a socket rod 2 having a socket rod flange 5 with a basically spheroid concave bearing surface 5a at a first end using a 3D printing or additive manufacturing, AM, technique. The method M further comprises at M2 forming a housing nut 1 encircling the socket rod 2 and having a threaded wrenching head 1a using a 3D printing or AM technique. The method M further comprises at M3 forming a ball rod 6 having a basically spheroid convex bearing surface 6a and threaded side walls 6c around the bearing surface 6a using a 3D printing or AM technique.

The method M further comprises at M4 forming a concave-convex sliding washer 11 with a basically spheroid convex washer surface 11a and a basically spheroid concave washer surface 11b using a 3D printing or AM technique, wherein the convex washer surface 11a is covered with a plurality of first washer guiding tracks 12a oriented into the first swivelling direction S1 and the concave washer surface 11b is covered with a plurality of second guiding tracks 12b oriented into the second swivelling direction S2. In this case, the method M further comprises at M5 arranging the concave-convex sliding washer 11 between the socket rod flange 5 and the ball rod 6, thereby slidably interlocking the first guiding tracks 5b of the concave bearing surface 5a of the socket rod flange 5 with the first washer guiding tracks 12a of the convex washer surface 11a of the concave-convex sliding washer 11 and the second guiding tracks 6b of the convex bearing surface 6a of the ball rod 6 with the second washer guiding tracks 12b of the concave washer surface 11b of the concave-convex sliding washer.

In an alternative embodiment, instead of the method steps at M4 and M5 described above, the method M may comprise slidably interlocking the first guiding tracks 5b of the concave bearing surface 5a of the socket rod flange 5 with the second guiding tracks 6b of the convex bearing surface 6a of the ball rod 6. In this embodiment no concave-convex sliding washer 11 is provided and hence the rotary joint 10 features only one swivelling direction of freedom.

Finally, the method M comprises at M6 threadingly engaging the threaded wrenching head 1a of the housing nut 1 with the threaded side walls 6c of the ball rod 6, thereby housing the socket rod flange 5 between the housing nut 1 and the ball rod 6.

The rotary joint 10, the frameworks 100 making use of such rotary joints 10 and the methods for manufacturing those rotary joints 10 reduce the number of individual parts necessary for the formation and functionality of the rotary joints 10 to a minimum. On one hand, the installation effort for such joints is minimized—on the other hand, the design precision in alignment of the individual parts advantageously decrease with the reduction in part count.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A rotary joint comprising:
a socket rod having a socket rod flange with a basically spheroid concave bearing surface at a first end;
a housing nut encircling the socket rod and having a threaded wrenching head;
a ball rod having a basically spheroid convex bearing surface and threaded side walls around the bearing surface; and
a concave-convex sliding washer with a basically spheroid convex washer surface and a basically spheroid concave washer surface;
wherein a diameter of the threaded side walls of the ball rod corresponds to a diameter of the threaded wrenching head of the housing nut;
wherein a plurality of first guiding tracks are on the concave bearing surface and are oriented into a first swivelling direction, the socket rod being swivellable with respect to the ball rod along the first guiding tracks into the first swivelling direction;
wherein a plurality of second guiding tracks are on the convex bearing surface and are oriented into a second swivelling direction, the socket rod being swivellable with respect to the ball rod along the second guiding tracks into the second swivelling direction; and
wherein a plurality of first washer guiding tracks are on the convex washer surface and oriented into the first swivelling direction and wherein a plurality of second washer guiding tracks are on the concave washer surface and oriented into the second swivelling direction.

2. The rotary joint of claim 1, wherein the first swivelling direction is perpendicular to the second swivelling direction and the first guiding tracks of the concave bearing surface of the socket rod flange are slidably interlocked with the first washer guiding tracks of the convex washer surface and the second guiding tracks of the convex bearing surface of the ball rod are slidably interlocked with the second washer guiding tracks of the concave washer surface.

3. The rotary joint of claim 1, wherein the housing nut has a nut hole on the opposite side of the threaded wrenching head, the diameter of the nut hole being larger than the diameter of the socket rod, but smaller than the diameter of the socket rod flange.

4. The rotary joint of claim 1, wherein a curvature of the concave bearing surface of the socket rod flange corresponds to a curvature of the convex bearing surface of the ball rod.

5. The rotary joint of claim 1, wherein a curvature of the concave bearing surface of the socket rod flange corresponds to a curvature of the convex washer surface and a curvature of the convex bearing surface of the ball rod corresponds to a curvature of the concave washer surface.

6. The rotary joint of claim 1, wherein the socket rod comprises a threaded shank at a second end opposite to the first end.

7. The rotary joint of claim 1, further comprising:
a clamping bracket sleeved at least partly over the housing nut and the ball rod to interlock the housing nut with the ball rod.

8. A framework construction kit, comprising:
at least one rotary joint comprising:
a socket rod having a socket rod flange with a basically spheroid concave bearing surface at a first end;
a housing nut encircling the socket rod and having a threaded wrenching head;

a ball rod having a basically spheroid convex bearing surface and threaded side walls around the bearing surface; and a concave-convex sliding washer with a basically spheroid convex washer surface and a basically spheroid concave washer surface;

wherein a diameter of the threaded side walls of the ball rod corresponds to a diameter of the threaded wrenching head of the housing nut;

wherein a plurality of first guiding tracks are on the concave bearing surface and are oriented into a first swivelling direction, the socket rod being swivellable with respect to the ball rod along the first guiding tracks into the first swivelling direction;

wherein a plurality of second guiding tracks are on the convex bearing surface and are oriented into a second swivelling direction, the socket rod being swivellable with respect to the ball rod along the second guiding tracks into the second swivelling direction; and wherein a plurality of first washer guiding tracks are on the convex washer surface and oriented into the first swivelling direction and wherein a plurality of second washer guiding tracks are on the concave washer surface and oriented into the second swivelling direction; and at least one interconnection strut connected to a second end of the socket rod of the at least one rotary joint or connected to the ball rod of the at least one rotary joint.

9. The framework construction kit of claim 8, further comprising:

at least another rotary joint comprising:

a socket rod having a socket rod flange with a basically spheroid concave bearing surface at a first end;

a housing nut encircling the socket rod and having a threaded wrenching head; and a ball rod having a basically spheroid convex bearing surface and threaded side walls around the bearing surface;

wherein a diameter of the threaded side walls of the ball rod corresponds to a diameter of the threaded wrenching head of the housing nut;

wherein a plurality of first guiding tracks are on the concave bearing surface and are oriented into a first swivelling direction, the socket rod being swivellable with respect to the ball rod along the first guiding tracks into the first swivelling direction; and wherein a plurality of second guiding tracks are on the convex bearing surface and are oriented into a second swivelling direction, the socket rod being swivellable with respect to the ball rod along the second guiding tracks into the second swivelling direction; and a stepper drive length-adjustably connecting the socket rod or the ball rod of one rotary joint with the socket rod or the ball rod of another rotary joint.

10. The framework construction kit of claim 9, wherein the stepper drive comprises a female-threaded socket rod duct, which is engaged, at a first stepper drive end portion, with a threaded shank of the socket rod of one of the rotary joints and, at a second stepper drive end portion, with a threaded shank of the socket rod of another one of the rotary joints.

11. A framework comprising:

a plurality of rotary joints comprising:

a socket rod having a socket rod flange with a basically spheroid concave bearing surface at a first end;

a housing nut encircling the socket rod and having a threaded wrenching head;

a ball rod having a basically spheroid convex bearing surface and threaded side walls around the bearing surface; and a concave-convex sliding washer with a basically spheroid convex washer surface and a basically spheroid concave washer surface;

wherein a diameter of the threaded side walls of the ball rod corresponds to a diameter of the threaded wrenching head of the housing nut;

wherein a plurality of first guiding tracks are on the concave bearing surface and are oriented into a first swivelling direction, the socket rod being swivellable with respect to the ball rod along the first guiding tracks into the first swivelling direction;

wherein a plurality of second guiding tracks are on the convex bearing surface and are oriented into a second swivelling direction, the socket rod being swivellable with respect to the ball rod along the second guiding tracks into the second swivelling direction, and wherein a plurality of first washer guiding tracks are on the convex washer surface and oriented into the first swivelling direction and wherein a plurality of second washer guiding tracks are on the concave washer surface and oriented into the second swivelling direction;

the plurality of rotary joints attached to a plurality of bearing structures, respectively; and a plurality of interconnection struts, each connected to a socket rod or a ball rod of the plurality of rotary joints.

12. The framework of claim 11, further comprising:

a plurality of stepper drives each length-adjustably connecting the socket rod or the ball rod of one rotary joint with the socket rod or the ball rod of another rotary joint.

13. A method for manufacturing a rotary joint, the method comprising:

forming a socket rod having a socket rod flange with a basically spheroid concave bearing surface at a first end using a 3D printing or additive manufacturing, AM, technique, wherein a plurality of first guiding tracks are on the concave bearing surface and oriented into a first swivelling direction, the socket rod being swivellable with respect to the ball rod along the first guiding tracks into the first swivelling direction;

forming a housing nut encircling the socket rod and having a threaded wrenching head using a 3D printing or AM technique;

forming a ball rod having a basically spheroid convex bearing surface and threaded side walls around the bearing surface using a 3D printing or AM technique, wherein a plurality of second guiding tracks are on the convex bearing surface and oriented into a second swivelling direction, the socket rod being swivellable with respect to the ball rod along the second guiding tracks into the second swivelling direction;

forming a concave-convex sliding washer with a basically spheroid convex washer surface and a basically spheroid concave washer surface using a 3D printing or AM technique, wherein a plurality of first washer guiding tracks are on the convex washer surface and are oriented into the first swivelling direction and wherein a plurality of second guiding tracks are on the concave washer surface and oriented into the second swivelling direction;

arranging the concave-convex sliding washer between the socket rod flange and the ball rod, thereby slidably interlocking the first guiding tracks of the concave bearing surface of the socket rod flange with the first washer guiding tracks of the convex washer surface and the second guiding tracks of the convex bearing surface of the ball rod with the second washer guiding tracks of the concave washer surface; and after arranging the concave-convex sliding washer, threadingly engaging the threaded wrenching head of the housing nut with the threaded side walls of the ball rod, thereby housing the socket rod flange between the housing nut and the ball rod.

* * * * *